United States Patent
Tartz et al.

(10) Patent No.: US 9,507,420 B2
(45) Date of Patent: Nov. 29, 2016

(54) SYSTEM AND METHOD FOR PROVIDING HAPTIC FEEDBACK TO ASSIST IN CAPTURING IMAGES

(71) Applicant: QUALCOMM Incorporated, San Diego, CA (US)

(72) Inventors: Robert Scott Tartz, San Marcos, CA (US); Kirk Steven Taylor, San Diego, CA (US); Mark Stirling Caskey, San Diego, CA (US); Suzana Arellano, San Diego, CA (US); Charles Alfred Bergan, Cardiff, CA (US)

(73) Assignee: QUALCOMM Incorporated, San Diego, CA (US)

( * ) Notice: Subject to any disclaimer, the term of this patent is extended or adjusted under 35 U.S.C. 154(b) by 81 days.

(21) Appl. No.: 14/276,926

(22) Filed: May 13, 2014

(65) Prior Publication Data
US 2015/0334292 A1 Nov. 19, 2015

(51) Int. Cl.
| | |
|---|---|
| *G06F 3/01* | (2006.01) |
| *G06T 7/00* | (2006.01) |
| *H04N 5/232* | (2006.01) |
| *G08B 6/00* | (2006.01) |
| *H04M 1/725* | (2006.01) |

(52) U.S. Cl.
CPC ............... *G06F 3/016* (2013.01); *G06T 7/004* (2013.01); *G08B 6/00* (2013.01); *H04N 5/23219* (2013.01); *H04N 5/23222* (2013.01); *G06T 2207/10152* (2013.01); *H04M 1/72569* (2013.01); *H04M 2250/52* (2013.01)

(58) Field of Classification Search
CPC ..................... H04N 5/23219; H04N 5/23222; G06T 7/004; G08B 86/00
USPC ........... 348/333.11, 222.1, 333.02, 362, 169; 382/118
See application file for complete search history.

(56) References Cited

U.S. PATENT DOCUMENTS

| | | | |
|---|---|---|---|
| 8,526,677 B1* | 9/2013 | Crichton | G06T 7/004 382/103 |
| 2008/0226134 A1 | 9/2008 | Stetten et al. | |
| 2009/0251421 A1* | 10/2009 | Bloebaum | G06F 3/016 345/173 |
| 2010/0225773 A1* | 9/2010 | Lee | H04N 5/23219 348/222.1 |

(Continued)

FOREIGN PATENT DOCUMENTS

EP          2626775 A2       8/2013

OTHER PUBLICATIONS

International Search Report and Written Opinion—PCT/US2015/028199—ISA/EPO—Jul. 28, 2015, Jul. 28, 2015.

*Primary Examiner* — Nhan T Tran
(74) *Attorney, Agent, or Firm* — Kilpatrick Townsend & Stockton LLP

(57) ABSTRACT

Methods, systems, computer-readable media, and apparatuses for providing haptic feedback to assist in capturing images are presented. In some embodiments, a method for providing haptic feedback to assist in capturing images includes obtaining, via an image capture device, an ambient light measurement of an environment in which the image capture device is present. The method further includes detecting, via the image capture device, one or more objects within one or more image frames captured by the image capture device. The method also includes changing, via the image capture device, a manner in which haptic feedback is provided to a user of the image capture device, based at least in part on the obtained ambient light measurement and the detected one or more objects.

32 Claims, 9 Drawing Sheets

(56) References Cited

U.S. PATENT DOCUMENTS

| | | |
|---|---|---|
| 2011/0216209 A1 | 9/2011 | Fredlund et al. |
| 2012/0028577 A1* | 2/2012 | Rodriguez ....... H04N 21/44008 455/41.1 |
| 2012/0050324 A1* | 3/2012 | Jeong ...................... G06F 17/30 345/633 |
| 2012/0105663 A1 | 5/2012 | Cazier |
| 2012/0210423 A1 | 8/2012 | Friedrichs et al. |
| 2013/0089240 A1 | 4/2013 | Northcott et al. |
| 2013/0097706 A1 | 4/2013 | Titonis et al. |
| 2014/0192247 A1* | 7/2014 | Cheong .............. H04N 5/23222 348/333.11 |
| 2015/0005039 A1* | 1/2015 | Liu ....................... H04M 19/04 455/567 |

* cited by examiner

SYSTEM AND METHOD FOR PROVIDING HAPTIC FEEDBACK TO ASSIST IN CAPTURING IMAGES

BACKGROUND

Aspects of the disclosure relate to capturing images. More specifically, aspects of the disclosure relate to a system and method for providing haptic feedback to assist in capturing images.

Communication devices, e.g. smartphones, have become indispensable tools for today's users. Users consider their communication devices just as important as other items required in their day-to-day lives, e.g. wallets, keys etc. As a result, communication devices are carried with the user throughout different environments. Many communication devices include camera functionality to capture images. Since a user typically almost always has their communication device present, the ease of using the communication device to capture images is readily apparent. However, displays on communication devices can become difficult to use in environments where there is additional sensory input, such as bright light. The bright light in these environments, e.g. outdoors, can "wash out" the display of the communication device to the point where it becomes very difficult to see any content being presented on the display. An example of this is when a user wishes to take a "selfie" picture of themselves or a picture of themselves with their friends, using a front-facing camera of a communication device. As a result, many users are forced to point the camera at themselves and repeatedly attempt to press a capture button until an image of adequate quality is captured.

Current solutions include the communication device automatically detecting a gaze or smile within an image frame as a trigger, prior to capturing the image. However, these solutions only function adequately when the camera is correctly pointed toward the user's face upon a request for a captured image (e.g., a button on the communication device is pressed). Beyond increasing the brightness of the communication device's display, there is a lack in other methods to compensate for bright environments while capturing an image within a communication device. Some other solutions include an application that can audibly guide the user through centering his/her face for a "selfie" image once a face is detected. However, this solution does not account for environments where audible cues may not be optimal (e.g., a golf tournament or wedding ceremony), or where audible cues may be difficult to hear (e.g., a music concert). Accordingly, a need exists to allow the user to more easily capture an image in a bright environment where the communication device's display may not be easily viewable.

BRIEF SUMMARY

Certain embodiments are described for a system and method for providing haptic feedback to assist in capturing images.

Embodiments of the invention are configured to determine ambient levels of light in an environment, detect one or more objects within captured image frames, and dynamically adjust haptic feedback on a device based on the determined level of ambient light and the detected objects. As the ambient light becomes progressively brighter, the device may enable or increase haptic feedback to compensate for the loss in display visibility. For example, when a face is detected in the image frame(s), the device may vibrate. When the user is attempting to position the device such that the user's face is in an optimal location with the image frame, the device may change a manner in which the haptic feedback is provided as the user's face gets closer to the center of the image frame (e.g., the device may vibrate more rapidly as the user's face gets closer to the center).

The haptic feedback capability may be built into the communication device. The communication device may also include a touch-screen display. The haptic feedback capability can generate electro or mechanical signals that stimulate cutaneous sensory channels of the somatosensory system. Haptic feedback provides a useful sensory medium for the user that is private and beneficial when vision or hearing is not reliable or practical. The haptic feedback can further increase immersive user experiences and device usability for certain tasks. It can be appreciated that the term "communication device" is used loosely, and the term may include devices such as digital cameras, camcorders, etc.

In some embodiments, a method for providing haptic feedback to assist in capturing images includes obtaining, via an image capture device, an ambient light measurement of an environment in which the image capture device is present. The method further includes detecting, via the image capture device, one or more objects within one or more image frames captured by the image capture device. The method also includes changing, via the image capture device, a manner in which haptic feedback is provided to a user of the image capture device, based at least in part on the obtained ambient light measurement and the detected one or more objects.

In some embodiments, the step of detecting one or more objects comprises detecting a face within the one or more image frames captured by the image capture device.

In some embodiments, the step of changing the manner in which haptic feedback is provided comprises enabling haptic feedback.

In some embodiments, the step of changing the manner in which haptic feedback is provided comprises increasing an intensity of the haptic feedback provided.

In some embodiments, the step of changing the manner in which haptic feedback is provided comprises changing a type of haptic feedback provided.

In some embodiments, the step of changing the manner in which haptic feedback is provided comprises at least one of changing a frequency with which haptic feedback is provided or changing a duration with which haptic feedback is provided.

In some embodiments, the manner in which the haptic feedback is provided is changed based at least in part on a location, within the one or more image frames, of the detected objects relative to an optimal location within the one or more image frames.

In some embodiments, the manner in which the haptic feedback is provided is changed based at least in part on a size, within the one or more image frames, of the detected objects relative to a size of the one or more image frames.

In some embodiments, the haptic feedback comprises at least one of tactile feedback, vibration feedback, electrostatic feedback, or thermal feedback.

In some embodiments, a type of the haptic feedback is based at least in part on a quantity of the one or more detected objects.

In some embodiments, the obtaining step is performed using one or more ambient light sensors within the image capture device.

In some embodiments, an apparatus for providing haptic feedback to assist in capturing images includes an image capture device configured to capture one or more image frames, an ambient light sensor configured to obtain an ambient light measurement of an environment in which the apparatus is present, and a processor coupled to the ambient light sensor and the image capture device. The processor is configured to detect one or more objects within the one or more image frames. The processor is also configured to change a manner in which haptic feedback is provided to a user of the apparatus, based at least in part on the obtained ambient light measurement and the detected one or more objects.

In some embodiments, an apparatus for providing haptic feedback to assist in capturing images includes means for obtaining, via an image capture device, an ambient light measurement of an environment in which the image capture device is present. The apparatus also includes means for detecting, via the image capture device, one or more objects within one or more image frames captured by the image capture device. The apparatus further includes means for changing, via the image capture device, a manner in which haptic feedback is provided to a user of the image capture device, based at least in part on the obtained ambient light measurement and the detected one or more objects.

In some embodiments, a processor-readable non-transitory medium comprising processor readable instructions configured to cause a processor to obtain, via an image capture device, a ambient light measurement of an environment in which the image capture device is present. The instructions are further configured to cause the processor to detect, via the image capture device, one or more objects within one or more image frames captured by the image capture device. The instructions are further configured to cause the processor to change, via the image capture device, a manner in which haptic feedback is provided to a user of the image capture device, based at least in part on the obtained ambient light measurement and the detected one or more objects.

BRIEF DESCRIPTION OF THE DRAWINGS

Aspects of the disclosure are illustrated by way of example. In the accompanying figures, like reference numbers indicate similar elements, and.

DETAILED DESCRIPTION

Several illustrative embodiments will now be described with respect to the accompanying drawings, which form a part hereof. While particular embodiments, in which one or more aspects of the disclosure may be implemented, are described below, other embodiments may be used and various modifications may be made without departing from the scope of the disclosure or the spirit of the appended claims.

Figure 1:
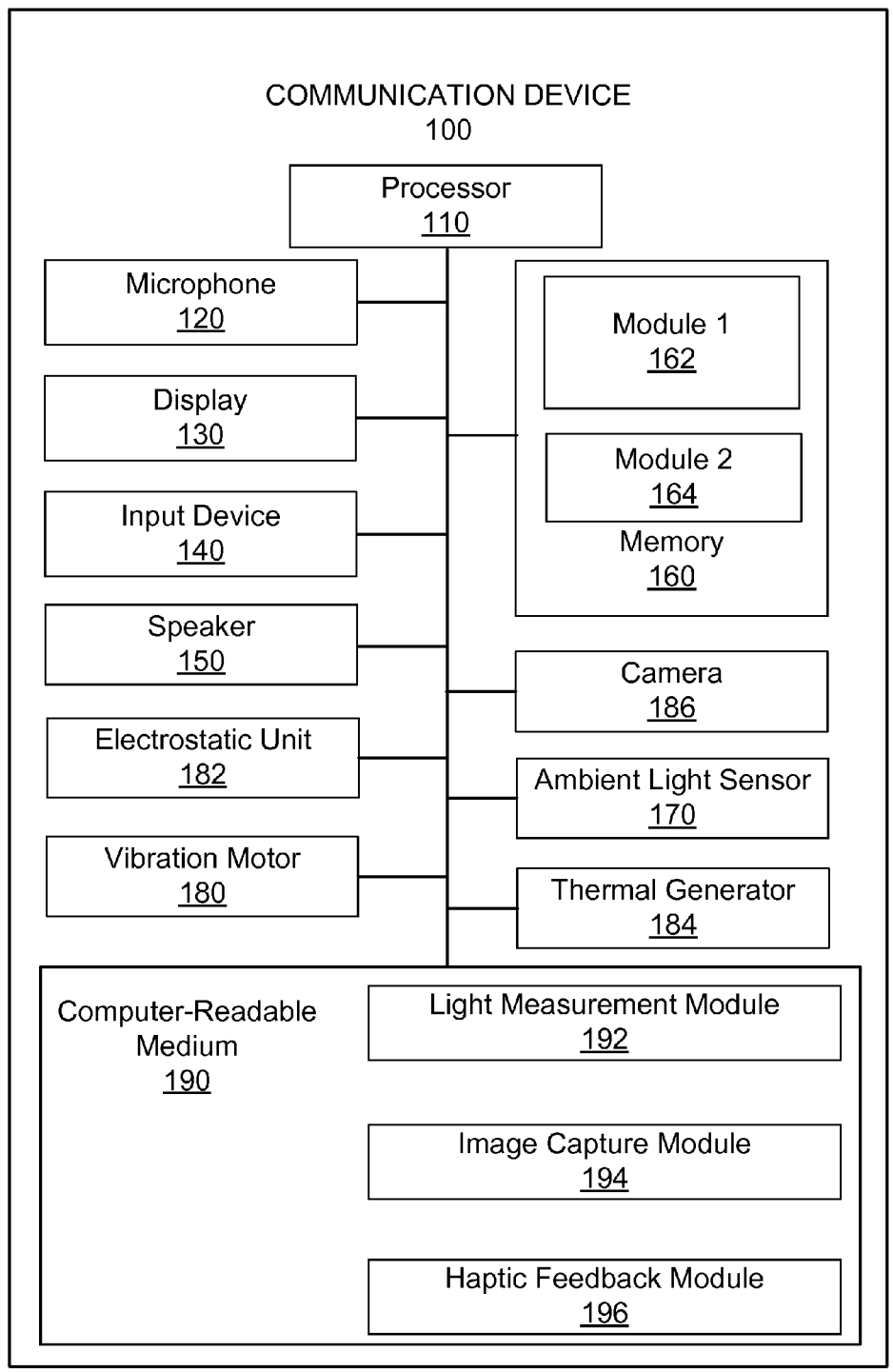
FIG. 1 illustrates a simplified block diagram of a communication device that may incorporate one or more embodiments.

FIG. 1 illustrates a simplified block diagram of a communication device 100 that may incorporate one or more embodiments. Communication device 100 includes a processor 110, display 130, input device 140, speaker 150, memory 160, ambient light sensor 170, vibration motor 180, electrostatic unit 182, thermal generator 184, and computer-readable medium 190.

Processor 110 may be any general-purpose processor operable to carry out instructions on the communication device 100. The processor 110 is coupled to other units of the communication device 100 including display 130, input device 140, speaker 150, memory 160, ambient light sensor 170, vibration motor 180, electrostatic unit 182, thermal generator 184, and computer-readable medium 190.

Microphone 120 may be any device that converts a sound input to an electrical signal. The microphone 120 may capture a user's voice or any other sound in a proximity to the communication device 100.

Display 130 may be any device that displays information to a user. Examples may include an LCD screen, CRT monitor, or seven-segment display. In some embodiments, display 130 may be a touchscreen display capable of providing haptic feedback.

Input device 140 may be any device that accepts input from a user. Examples may include a keyboard, keypad, mouse, or touch input.

Speaker 150 may be any device that outputs sound to a user. Examples may include a built-in speaker or any other device that produces sound in response to an electrical audio signal.

Memory 160 may be any magnetic, electronic, or optical memory. Memory 160 includes two memory modules, first module 162 and second module 164. It can be appreciated that memory 160 may include any number of memory modules. An example of memory 160 may be dynamic random access memory (DRAM).

Computer-readable medium 190 may be any magnetic, electronic, optical, or other computer-readable storage medium. Computer-readable storage medium 190 stores computer-readable code comprising code modules, including light measurement module 192, image capture module 194, and haptic feedback module 196.

Ambient light sensor 170 is configured to detect light or brightness in a similar way as the human eye. The ambient light sensor 170 is a specific version of a photodiode, capable of converting light into a voltage or current. The ambient light sensor 170 may have a typical spectral response ranging from 350 nm to 1100 nm. As such, the ambient light sensor 170 can detect the amount of ambient light of an environment in which the communication device 100 is present.

Vibration motor 180 is a small electric motor connected to an eccentric weight. Vibration motor 180 is configured to vibrate upon an event related to communication device 100. The vibration generated by the vibration motor 180 can vibrate communication device 100 such that a user can feel, sense, or otherwise notice the vibration. It can be appreciated that vibration motor 180 can generate a vibration simultaneous to an audio alert generated by speaker 150.

Electrostatic unit 182 is configured to generate an electric charge through display 130. More specifically, the electrostatic unit 182 can generate varying electrostatic fields that can be pushed through a surface of display 130 giving the user of the communication device 100 a feeling of various levels of friction when interacting (e.g. touching) with the display 130.

Thermal generator 184 is configured to generate heat through communication device 100. More specifically, thermal generator 184 can generate heat through various surfaces of communication device 100, including the display 130 or any other part of the body. The user of communication device 100 can feel or otherwise notice the heat generated by the thermal generator 184.

Camera 186 is configured to capture one or more images via a lens located on the body of communication device 100. The captured images may be still images or video images. The camera 186 may include a CMOS image sensor to capture the images. Various applications running on processor 110 may have access to camera 186 to capture images. It can be appreciated that camera 186 can continuously capture images without the images actually being stored within communication device 100. Captured images may also be referred to as image frames.

The light measurement module 192 contains code that, when executed by processor 110, analyzes the ambient light measurement obtained by ambient light sensor 170. It can be appreciated that light measurement module 192 can include logic to control ambient light sensor 170. For example, ambient light sensor 170 may obtain an ambient light measurement upon instruction to do so from light measurement module 192. Light measurement module 192 may also further analyze the obtained ambient light measurement from ambient light sensor 170. For example, light measurement module 192 may compare the obtained light measurement to a threshold amount of light and relay results of the comparison to the haptic feedback module 196 (described below). If the obtained light measurement is greater than the threshold amount of light, the light measurement module 192 may determine that the environment conditions are not conducive for capturing images, as the amount of light may make the display 130 of the communication device 100 difficult to view. In some embodiments, the light measurement module 192 may instruct the ambient light sensor 170 to obtain an ambient light measurement at predetermined intervals, e.g. every 10 seconds.

The image capture module 194 contains code that, when executed by processor 110, instructs camera 186 to capture the one or more images. Image capture module 194 may also interface with memory 160 to store the one or more captured images. Additionally, the image capture module 194 may analyze various aspects of images captured by camera 186 and relay the analysis to haptic feedback module 196 (described below). For example, the image capture module 194 may detect an object within an image captured by the camera 186. The object may be a user's face. Upon detecting the user's face, the image capture module 194 may relay information that a face has been detected to haptic feedback module 196. Image capture module 194 may also determine whether an object within the image is at an optimal location within the image, e.g. whether the object is in the center of the image. Further, image capture module 194 may also determine whether an object within the image frame is at an appropriate zoom level within the image, e.g. whether the object is too large or too small for an optimal image.

The haptic feedback module 196 contains code that, when executed by processor 110, enables or disables haptic feedback on the communication device 100. The haptic feedback module 196 is also configured to change a type of haptic feedback on the communication device 100. Changing a type of haptic feedback may also include changing an intensity of the haptic feedback. For example, in response to the light measurement module 192 determining that the obtained ambient light measurement exceeds a threshold light amount, the haptic feedback module 196 may enable haptic feedback on the communication device 100 to assist the user to capture images using the device, via camera 186, while in harsh/bright lighting conditions. In another example, the haptic feedback module 196 may disable haptic feedback once the communication device 100 enters an environment where an obtained ambient light measurement is below the threshold light amount. Further, the haptic feedback module 196 can change between vibration based haptic feedback, electrostatic based haptic feedback, and/or thermal based haptic feedback (or any other type of haptic feedback) based on the analysis of the light measurement module 192.

Figure 2:
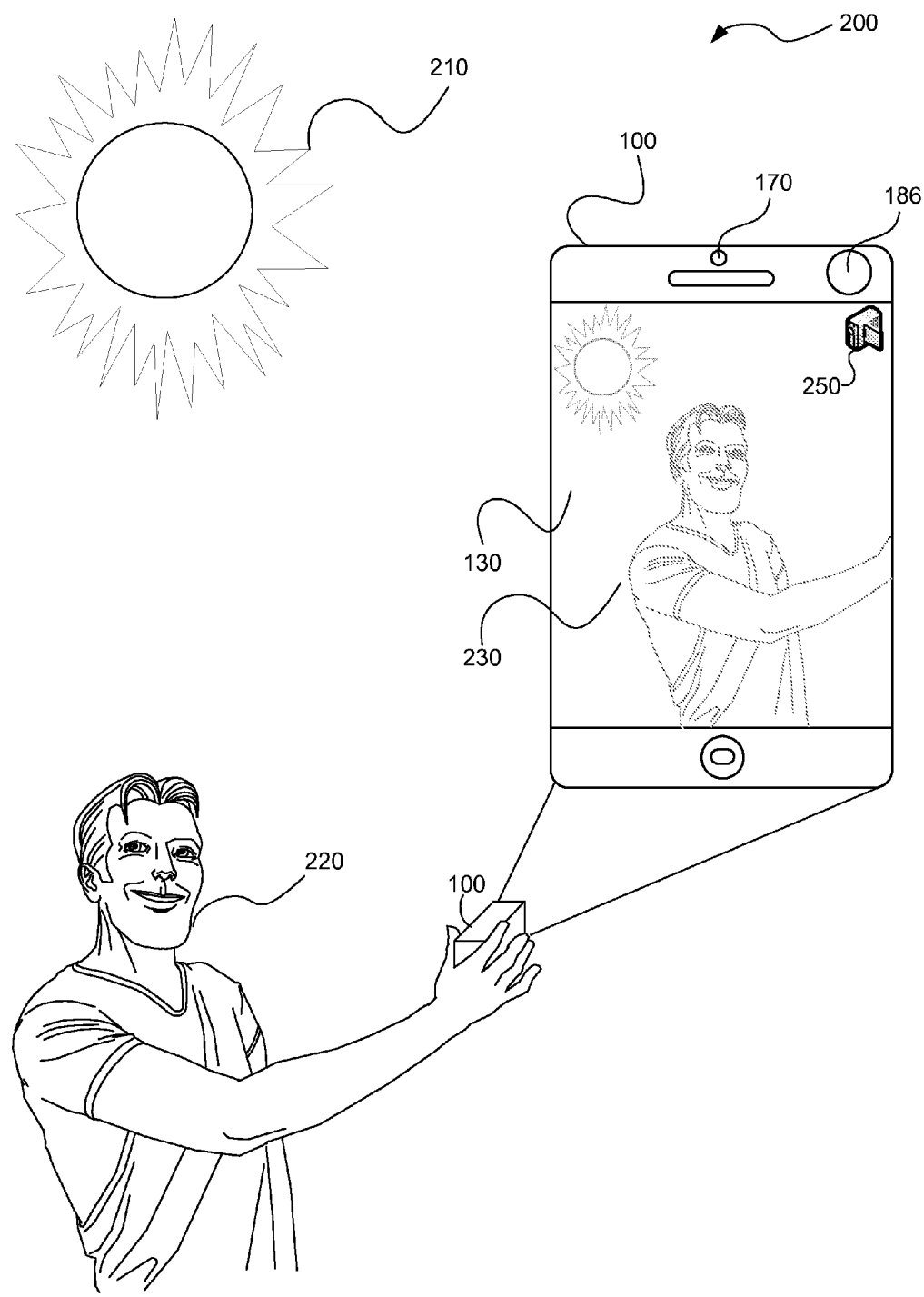
FIG. 2 illustrates a user operating a communication device to capture an image in a bright environment.

FIG. 2 illustrates a user 220 operating a communication device 100 to capture an image in a bright environment 200. In this example, the user 220 is using the communication device 100 to capture a self-portrait image of themself. Typically, the communication device 100 includes a front-facing camera 186 to capture the image, a preview of which can be seen on the display 130 by the user 220. However, the environment 200 includes a high amount of ambient light generated by, for example, the sun 210. In such cases, the display 130 of the communication device 100 may become difficult to see as a result of the high amount of ambient light, and in turn it becomes difficult for the user 220 to capture the self-portrait image of themself. Often times, the display 130 of the communication device 100 may become "washed out" where icons, characters, and content 230 (in this case, a preview of the camera image) typically displayed on display 130 may not be easily viewable by the user 220. As shown in FIG. 2, the content 230 displayed on the display 130 of the communication device 100 is washed out and difficult to view. However, there are many instances where the user 220 may wish to capture an image with the communication device 100 in bright environments 200. For example, there are many instances where a user 220 may want to capture an image with his/her communication device 100 while outdoors, at an outdoor sporting event, inside a brightly lit room, etc.

It can be appreciated that while FIG. 2 illustrates the user 220 capturing a self-portrait image of themself, the concepts described herein also apply to capturing images of other persons, objects, landscapes, etc. in the environment 200.

As described above, the communication device 100 may include an ambient light sensor 170. The ambient light sensor 170 can be used to obtain an ambient light measurement of the environment 200. In some embodiments, the light measurement module 192 (FIG. 1) may instruct the ambient light sensor 170 to obtain an ambient light measurement of the environment 200 at predefined intervals, e.g., every 5 seconds. As a result, if the user 220 travels with the communication device 100 from an environment having a low level of ambient light to an environment having a high level of ambient light, the light measurement module 192 (FIG. 1) may obtain the ambient light measurement, via ambient light sensor 170, of the bright environment 200 within a short time from when the user moves into the bright environment.

The communication device 100 may change a type of haptic feedback provided to the user 220 based at least in part on the obtained ambient light measurement by the light measurement module 192 (FIG. 1). As described above, the light measurement module 192 (FIG. 1) may instruct the ambient light sensor 170 to obtain an ambient light measurement. The light measurement module 192 (FIG. 1) may analyze the obtained ambient light measurement to determine whether a manner in which haptic feedback provided to the user 220 should be changed. Changing the manner in which haptic feedback is provided to the communication device 100 may include enabling/disabling haptic feedback on the communication device 100, changing the type of haptic feedback on the communication device 100, changing the intensity of haptic feedback on the communication device 100, changing the duration of the haptic feedback, and/or changing the frequency of the haptic feedback on the communication device 100. Changing a manner in which the haptic feedback is provided to the communication device may be executed by the haptic feedback module 196 (FIG. 1).

As described above, the haptic feedback module 196 (FIG. 1) is configured to enable or disable haptic feedback on the communication device 100. The haptic feedback module 196 (FIG. 1) is also configured to change a type of haptic feedback provided on the communication device 100, change the intensity of haptic feedback on the communication device 100, change the duration of the haptic feedback 100, and/or change the frequency of the haptic feedback on the communication device 100. The light measurement module 192 (FIG. 1) may communicate a determination about ambient light in the environment 200 with the haptic feedback module 196 (FIG. 1). For example, the light measurement module 192 (FIG. 1) may communicate whether the obtained ambient light measurement is above or below a predefined threshold amount of light to the haptic feedback module 196 (FIG. 1). In response, the haptic feedback module 196 (FIG. 1) may enable/disable or change a type of haptic feedback on the communication device 100, provided to the user 220. The types of haptic feedback that may be provided by the communication device 100 to the user 220 includes, but is not limited to, vibration based haptic feedback, electrostatic based haptic feedback, thermal based haptic feedback, or a combination of any of these.

For example, if the user 220 begins using the communication device 100 to capture an image under ambient room light, e.g. in a living room, the user 220 is most reliant on sight to view the display 130 and interact with the device, provided that the ambient light in the living room is not abnormally bright. Interacting with the communication device 100 may include viewing content 230 on the display 130 including a preview of the camera image, and/or engaging buttons or interacting and interpreting with a user interface displayed on the display 130. The user interface may include textual information about the current camera settings and/or may include buttons to change the camera settings. The light measurement module 192 may determine that the ambient light level in the living room is low (or below the predefined threshold of light), and thus the haptic feedback module 196 (FIG. 1) may not change a manner in which the haptic feedback is provided to the user. In other words, the haptic feedback module 196 (FIG. 1) may not enable haptic feedback if it is disabled, or may not change the type of haptic feedback if it is enabled.

If the user then moves, with the communication device 100, to an environment with brighter ambient light, e.g. outdoors, the light measurement module 192 (FIG. 1) may determine, upon the ambient light sensor's 170 next obtained ambient light measurement, that the ambient light measurement exceeds a predefined threshold amount of light, indicating that the display 130 may be difficult to view by the user 220. Accordingly, the haptic feedback module 196 (FIG. 1) may enable haptic feedback on the communication device 100 if it is not already enabled or may change a type of haptic feedback provided if it is already enabled. It can be appreciated that there may be a number of predefined threshold amounts of light. For example, there may be a threshold of 60,000 1x (lumens per square meter) which would cause the haptic feedback module 196 (FIG. 1) to enable haptic feedback on the communication device 100 and a threshold of 80,000 1x which would cause the haptic feedback module 196 (FIG. 1) to change the haptic feedback type to electrostatic feedback.

The haptic feedback provided by the communication device 100 may be used for a variety of interactions for capturing images with the communication device 100 while in the bright environment 200. For example, the haptic feedback may be provided for opening the camera application, acknowledging a camera prompt, changing a camera setting, providing framing instructions, alerting the user of a successful image capture, etc.

In one example, the user 220 may wish to capture a self-portrait image of themself using the front facing camera 186 of the communication device 100. The communication device 100 may alert the user 220 that the display 130 may be difficult to view in the bright environment in response to an obtained ambient light measurement greater than the predefined threshold amount of light. In some embodiments, the alert may be an audio alert. For example, the communication device 100 may play the following phrase via the speaker 150 (FIG. 1): "High ambient light detected, haptics enabled". It can be appreciated that communication device 100 may play any other phrase indicating to the user 220 that haptic feedback has been enabled. In other embodiments, the alert may be a haptic feedback based alert. For example, the communication device 100 may vibrate to alert the user that it is entering a mode in which haptic feedback is enabled. Alternatively, communication device 100 may provide no indication before enabling or changing haptic feedback. Further, the communication device 100 may enter a simplified mode of operation, wherein only basic camera functionality of the device is available to the user 220, to avoid erroneous input. The basic camera functionality may include only the capability to capture images and may prevent the user from changing any camera settings. The simplified mode may require longer interaction by the user 220, e.g., pressing the shutter button 250 within a user interface shown on display 130 for a longer period of time than normal. Once the user 220 successfully captures the image, the communication device 100 may trigger a haptic feedback event indicating that the image was successfully captured. The haptic feedback may include vibration based haptic feedback, electrostatic based haptic feedback, thermal based haptic feedback, a combination of any of the above, or any other type of haptic feedback. Since the user may not clearly view the display 130 of the communication device while capturing an image due to the bright environment 200, the user 220 may feel around the display 130 with a user extremity, e.g. a finger, to find the shutter button 250 within the user interface in order to capture the image. Once the user 220 successfully touches the shutter button 250 within the user interface, the device may again trigger haptic feedback to indicate to the user 220 that he/she has successfully acknowledged the prompt. For example, the communication device 100 may trigger electrostatic feedback in an area around the shutter button 250 to notify the user 220 he that he has successfully touched the shutter button 250. Also, upon successfully touching the shutter button 250 within the user interface on display 130, the communication device 100 may play an audio message via speaker 150 (FIG. 1) to inform the user of such. In some embodiments, the communication device 100 may also vibrate along with the audio message.

In some embodiments, the image capture module 194 (FIG. 1) may automatically capture and store an image without any manual input from the user (described in further detail below).

In some embodiments, the haptic feedback provided by the communication device 100 may differ based on the user's progress in capturing the image. For example, the haptic feedback provided may differ based on whether the communication device 100 determines whether the user is ready to capture the image or not. For example, if the user 220 is not properly positioned for the image, as determined by image capture module 194 (FIG. 1), the communication device 100 may provide haptic feedback to assist and instruct the user to properly position themselves within the image.

In some embodiments, the communication device 100 may disable the display 130 upon the light measurement module 192 determining that the obtained ambient light measurement exceeds the predefined threshold amount light amount.

Figure 3:
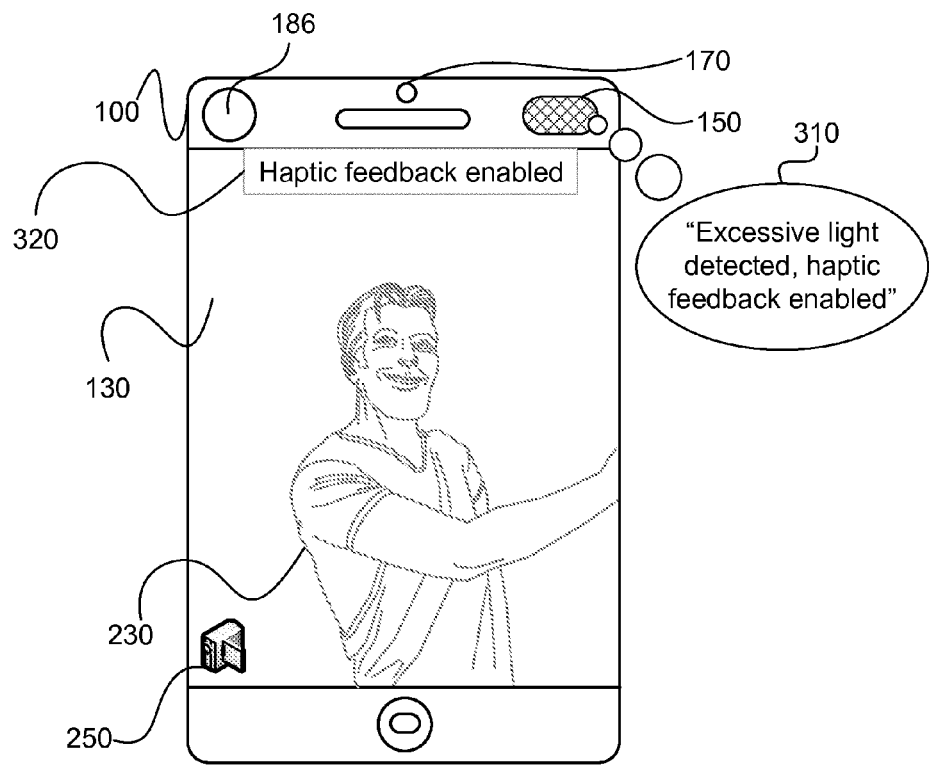
FIG. 3 illustrates enabling haptic feedback on a communication device as a result of an obtained ambient light measurement, according to some embodiments.

FIG. 3 illustrates enabling haptic feedback on a communication device 100 as a result of an obtained ambient light measurement, according to some embodiments. As discussed above, the communication device 100 may alert the user that the display 130 may be difficult to view for capturing an image in the bright environment in response to an obtained ambient light measurement that is greater than the predefined threshold of ambient light. In some embodiments, the alert may be an audio alert 310. For example, the communication device 100 may play the following audio alert 310 via the speaker 150: "Excessive light detected, haptic feedback enabled". The audio alert 310 may also be played concurrently with a type of haptic feedback on the communication device 100.

In some embodiments, the communication device 100 may alert the user by displaying a text alert 320 on the display 130. The text alert 320 may be displayed as a drop-down notification within the user interface of the display 130. It can be appreciated that the text alert 320 may also be shown within the user interface of the display 130 in a number of different ways. For example, the text alert 320 may also be displayed as a pop-up notification. In some embodiments, the text alert 320 may be displayed at a maximum brightness level of the display 130 or in specific font colors to maximize the likelihood that the user can properly view the characters of the text alert 320 in a bright environment. The text alert 320 may also be displayed concurrently with a type of haptic feedback on the communication device 100.

As shown in FIG. 3, the content 230 (preview of camera image) shown on the display 130 is washed out and difficult to view. The audio alert 310 and/or text alert 320 may assist with the user 220 (FIG. 2) with the loss of the visual channel. It can be appreciated that the communication device 100 may alert the user using both the audio alert 310 and the text alert 320 simultaneously. In some embodiments, the communication device 100 may also vibrate along with the audio message.

Once the light measurement module 192 (FIG. 1) determines that the ambient light sensor 170 has obtained an ambient light measurement that is below the predefined threshold amount of light, the haptic feedback may be disabled or changed.

Figure 4A:
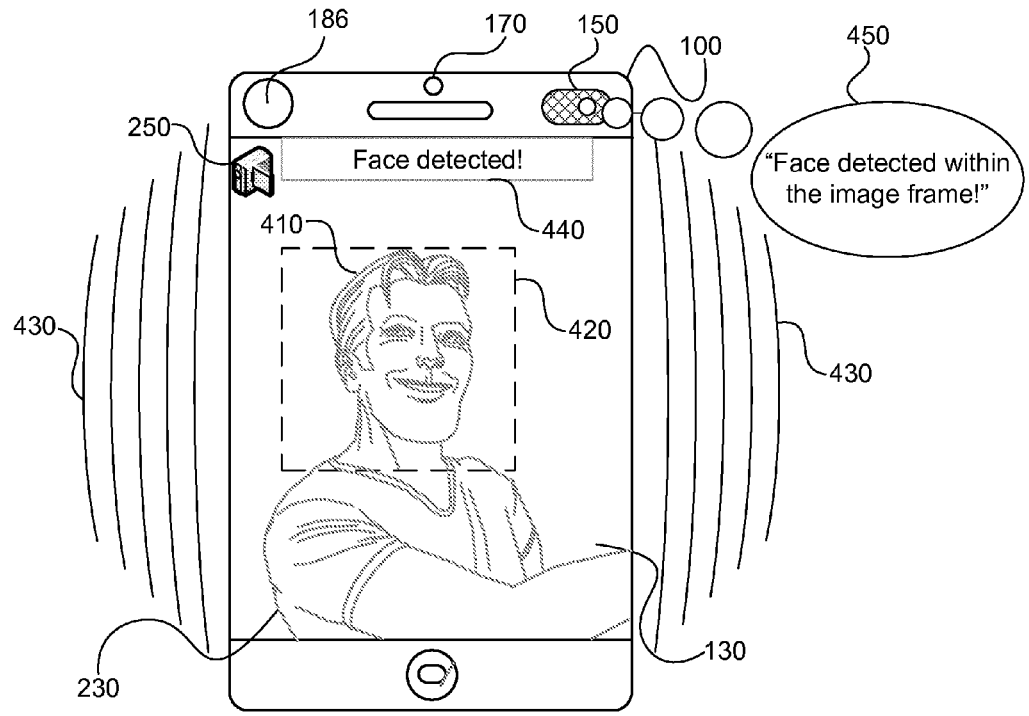
FIG. 4A illustrates providing vibration based haptic feedback 430 on a communication device 100 in response to detecting a face 410, according to some embodiments.

FIG. 4A illustrates providing vibration based haptic feedback 430 on a communication device 100 in response to detecting a face 410, according to some embodiments. As described above, vibration based haptic feedback 430 is one of many types of haptic feedback that may be provided on the communication device 100. The vibration based haptic feedback 430 may be enabled upon the light measurement module 192 (FIG. 1) determining that the ambient light present in the environment exceeds the threshold amount of light. In some embodiments, the vibration based haptic feedback 430 may already be enabled or an intensity of the feedback may be changed based upon the determination by the light measurement module 192 (FIG. 1).

As shown in FIG. 4A, the content 230 (preview of camera image) shown on the display 130 is washed out and difficult to view. The vibration based haptic feedback 430 may be provided in response to the communication device 100 detecting a face within an image frame of the camera 186. Prior to capturing and storing the image, the image capture module 194 (FIG. 1) may analyze current image frames from camera 186. If the image capture module 194 (FIG. 1) detects a face within the image frame, the communication device 100 may provide vibration based haptic feedback 430 to notify the user that his/her face has been detected within the image frame. The vibration based haptic feedback 430 may be provided by using vibration motor 180 (FIG. 1), to notify the user of such. The vibration based haptic feedback 430 may indicate to the user that he/she may continue to capture the image since he/she is properly detected in the image frame.

Since the user may not be able to clearly view the display 130, due to the high amount of ambient light, the user may move their finger randomly around the display 130 in an attempt to press a shutter button 250 within the user interface to capture the image. The communication device 100 may provide haptic feedback indicating that the user has correctly pressed the shutter button 250. For example, once the user moves his/her finger over the shutter button 250 within the user interface of display 130, the communication device 100 may provide vibration based haptic feedback 430 to indicate to the user that he/she has correctly captured an image by pressing the shutter button 250. In some embodiments, where more than one button 421 exists, the communication device 100 may provide a different type or intensity of haptic feedback per each button interaction. For example, if two buttons are presented to the user representing a shutter button 250 and, e.g. a flash enable button (not shown) selection, the communication device 100 may provide three rapid instances of vibration based haptic feedback 430 for the shutter button 250 selection and two rapid instances of vibration based haptic feedback 430 for the flash enable button selection. Alternatively, the communication device 100 may provide high intensity vibration based haptic feedback 430 for the shutter button 250 selection and low intensity vibration based haptic feedback 430 for the flash enable button selection. It can be appreciated that this example illustrates using duration of the haptic feedback to convey meaning.

In some embodiments, the image capture module 194 (FIG. 1) may automatically capture and store an image upon detecting the face 410 within the image frame of the camera 186. There may be a delay, e.g. 2 seconds, between detecting the frame and capturing the image. The communication device 100 may provide vibration based haptic feedback 430 once the image has been captured. By automatically capturing the image, the communication device 100 provides assistance to the user in capturing images while in bright environments where the content 230 on the display 130 may be difficult to view.

In some embodiments, the communication device 100 may provide audio feedback 450 concurrently with the vibration based haptic feedback 430. For example, the communication device 100 may play an audio phrase, via speaker 150, reciting "Face detected within the image frame" concurrently with the vibration based haptic feedback 430. In some embodiments, the communication device 100 may provide text feedback 440 concurrently with the vibration based haptic feedback 430. For example, the communication device 100 may display within the user interface of the display 130, "Face detected!" The text feedback 440 may be displayed at the highest brightness setting. Additionally, the communication device 100 may display an outline box 420 around the detected face 410. In some embodiments, more than one type of haptic feedback may be provided concurrently by the communication device 100. For example, the vibration based haptic feedback 430 may be provided concurrently with electrostatic based haptic feedback and/or thermal based haptic feedback.

Once the light measurement module 192 (FIG. 1) determines that the ambient light sensor 170 has obtained an ambient light measurement that is below the predefined threshold amount of light, the haptic feedback may be disabled or changed by haptic feedback module 196 (FIG. 1). For example, an ambient light measurement of 60,000 1× may trigger an action by haptic feedback module 196 (FIG. 1).

Figure 4B:
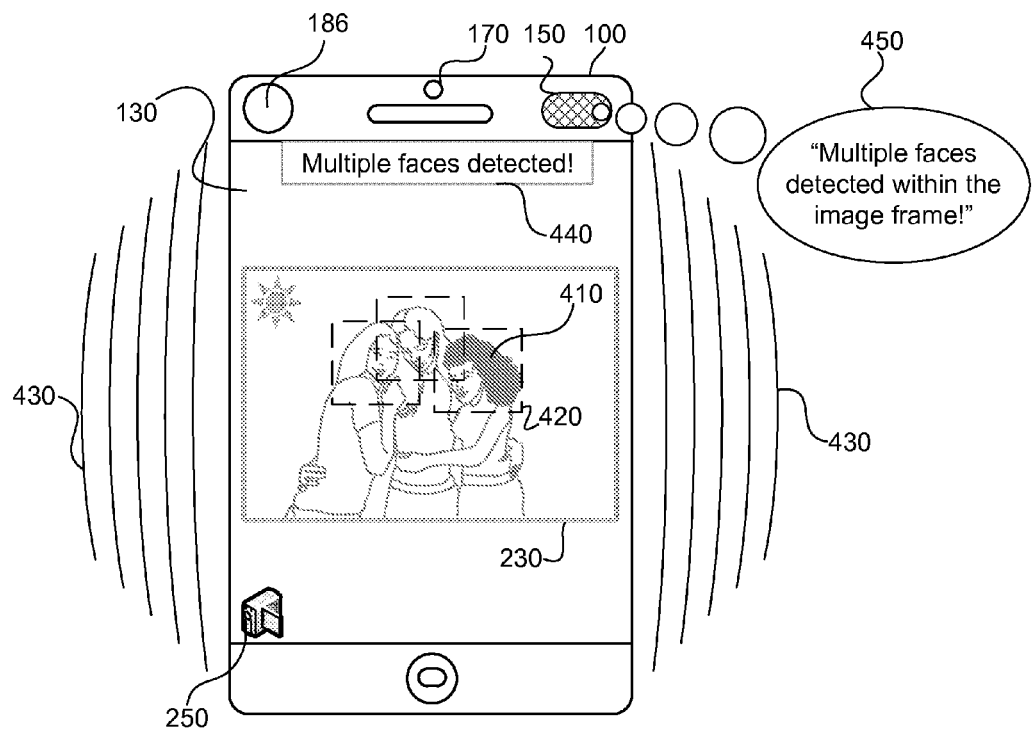
FIG. 4B illustrates providing vibration based haptic feedback 430 on a communication device 100 in response to detecting multiple faces 410, according to some embodiments.

FIG. 4B illustrates providing vibration based haptic feedback 430 on a communication device 100 in response to detecting multiple faces 410, according to some embodiments. As described above, the communication device 100 may provide vibration based haptic feedback 430 in response to detecting a face 410 within the image frame of camera 186. The face detection may be performed by image capture module 194 (FIG. 1). In FIG. 4B, the user is taking a picture of three other individuals, rather than a picture of themself as in FIG. 4A. The communication device 100 may also detect multiple faces 410 within the image frame of camera 186. For each detected face, the communication device 100 may also display an outline box around each face 410. For example, as shown in FIG. 4B, three faces 410 are detected, as shown by an outline box 420 around each detected face 410. The vibration based haptic feedback 430 may indicate to the user that he/she may continue to capture the image since the other individuals are properly detected in the image frame. This method of feedback may aid the user in capturing the image when the display 130 has become difficult to view as a result of the bright environment.

The communication device 100 may provide an increased duration of vibration based haptic feedback 430 based on the number of detected faces 410. For example, upon the image capture module 194 (FIG. 1) detecting three faces, the haptic feedback module 196 (FIG. 1) may provide three instances of vibration based haptic feedback 430 (one instance for each detected face 410). This example illustrates using haptic feedback duration to convey meaning. In other embodiments, the communication device 100 may provide a different type of haptic feedback if multiple (or more than one) faces 410 are detected within the image frame. For example, upon the image capture module 194 (FIG. 1) detecting three faces, the haptic feedback module 196 (FIG. 1) may provide thermal based haptic feedback instead of vibration based haptic feedback 430, indicating to the user that more than one face 410 has been detected within the image frame.

In some embodiments, the image capture module 194 (FIG. 1) may automatically capture and store an image upon detecting the multiple faces 410 within the image frame of the camera 186. There may be a delay, e.g. 2 seconds, between detecting the frame and capturing the image. The communication device 100 may provide vibration based haptic feedback 430 once the image has been captured. By automatically capturing the image, the communication device 100 provides assistance to the user in capturing images while in bright environments where the content 230 on the display 130 may be difficult to view.

In some embodiments, the communication device 100 may provide audio feedback 450 concurrently with the vibration based haptic feedback 430. For example, the communication device 100 may play an audio phrase, via speaker 150, reciting "Multiple faces detected within the image frame!" concurrently with the vibration based haptic feedback 430. In some embodiments, the communication device 100 may provide text feedback 440 concurrently with the vibration based haptic feedback 430. For example, the communication device 100 may display within the user interface of the display 130, "Multiple faces detected!" The text feedback 440 may be displayed at the highest brightness setting. Additionally, the communication device 100 may display multiple outline boxes 420 around the multiple detected faces 410. In some embodiments, more than one type of haptic feedback may be provided concurrently by the communication device 100. For example, the vibration based haptic feedback 430 may be provided concurrently with electrostatic based haptic feedback and/or thermal based haptic feedback. In some embodiments, the text feedback 440 or audio feedback 450 may indicate the number of faces 410 detected within the image frame.

Once the light measurement module 192 (FIG. 1) determines that the ambient light sensor 170 has obtained an ambient light measurement that is below the predefined threshold amount of light, the haptic feedback may be disabled or changed by haptic feedback module 196 (FIG. 1).

Figure 5:
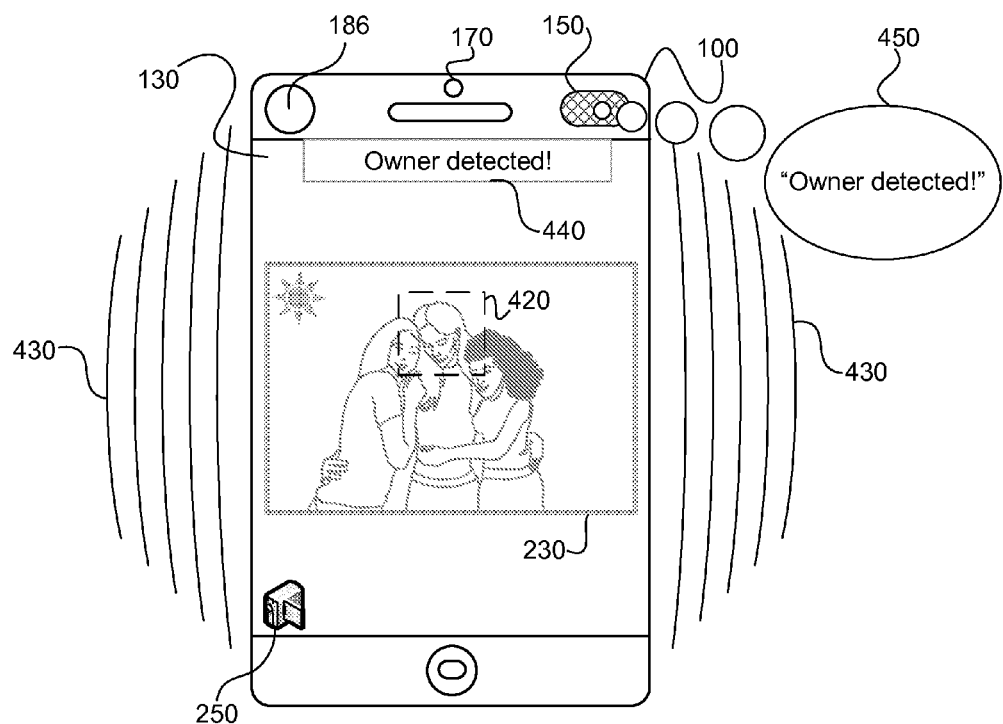
FIG. 5 illustrates providing vibration based haptic feedback 430 on a communication device 100 in response to detecting the primary user of the communication device 100, according to some embodiments.

FIG. 5 illustrates providing vibration based haptic feedback 430 on a communication device 100 in response to detecting the primary user of the communication device 100, according to some embodiments. More specifically, FIG. 5 illustrates a user capturing an image of other individuals, one of which is the primary user of the communication device. An individual may be registered as the primary user of the communication device via an operating system of the communication device. During registration, an image of the primary user's face may be captured using camera 186 for future facial recognition.

As shown in FIG. 5, the content 230 (preview of camera image) shown on the display 130 is washed out and difficult to view. The vibration based haptic feedback 430 may be provided in response to the communication device 100 detecting the primary user of the communication device 100 within an image frame of the camera 186. Prior to capturing and storing the image, the image capture module 194 (FIG. 1) may analyze current image frames from camera 186. If the image capture module 194 (FIG. 1) detects the primary user of the communication device 100 within the image frame, the communication device 100 may provide vibration based haptic feedback 430 to notify the user that the primary user has been detected within the image frame. The vibration based haptic feedback 430 may be provided by using vibration motor 180 (FIG. 1), to notify the user of such.

Since the user may not be able to clearly view the display 130, due to the high amount of ambient light, the user may move their finger randomly around the display 130 in an attempt to press a shutter button 250 within the user interface to capture the image. The communication device 100 may provide haptic feedback indicating that the user has correctly pressed the shutter button 250. For example, once the user moves his/her finger over the shutter button 250 within the user interface of display 130, the communication device 100 may provide vibration based haptic feedback 430 to indicate to the user that he/she has correctly captured an image by pressing the shutter button 250. In another example, the communication device 100 may provide electrostatic based haptic feedback to allow the user to feel the shutter button 250 prior to pressing it. In some embodiments, where more than one button 421 exists, the communication device 100 may provide a different type or duration of haptic feedback per each button interaction. For example, if two buttons are presented to the user representing a shutter button 250 and, e.g. a flash enable button (not shown) selection, the communication device 100 may provide three rapid instances of vibration based haptic feedback 430 for the shutter button 250 selection and two rapid instances of vibration based haptic feedback 430 for the flash enable button selection. Alternatively, the communication device 100 may provide high duration vibration based haptic feedback 430 for the shutter button 250 selection and low duration vibration based haptic feedback 430 for the flash enable button selection.

In some embodiments, the image capture module 194 (FIG. 1) may automatically capture and store an image upon detecting the primary user's face within the image frame of the camera 186. There may be a delay, e.g. 2 seconds, between detecting the frame and capturing the image. The communication device 100 may provide vibration based haptic feedback 430 once the image has been captured. By automatically capturing the image, the communication device 100 provides assistance to the user in capturing images while in bright environments where the content 230 on the display 130 may be difficult to view.

In some embodiments, the communication device 100 may provide audio feedback 450 concurrently with the vibration based haptic feedback 430. For example, the communication device 100 may play an audio phrase, via speaker 150, reciting "Primary user detected!" concurrently with the vibration based haptic feedback 430. In some embodiments, the communication device 100 may provide text feedback 440 concurrently with the vibration based haptic feedback 430. For example, the communication device 100 may display within the user interface of the display 130, "Primary user detected!" The text feedback 440 may be displayed at the highest brightness setting. Additionally, the communication device 100 may display an outline box 420 around the primary user's face. In some embodiments, more than one type of haptic feedback may be provided concurrently by the communication device 100. For example, the vibration based haptic feedback 430 may be provided concurrently with electrostatic based haptic feedback and/or thermal based haptic feedback.

Once the light measurement module 192 (FIG. 1) determines that the ambient light sensor 170 has obtained an ambient light measurement that is below the predefined threshold amount of light, the haptic feedback may be disabled or changed by haptic feedback module 196 (FIG. 1).

Figure 6:
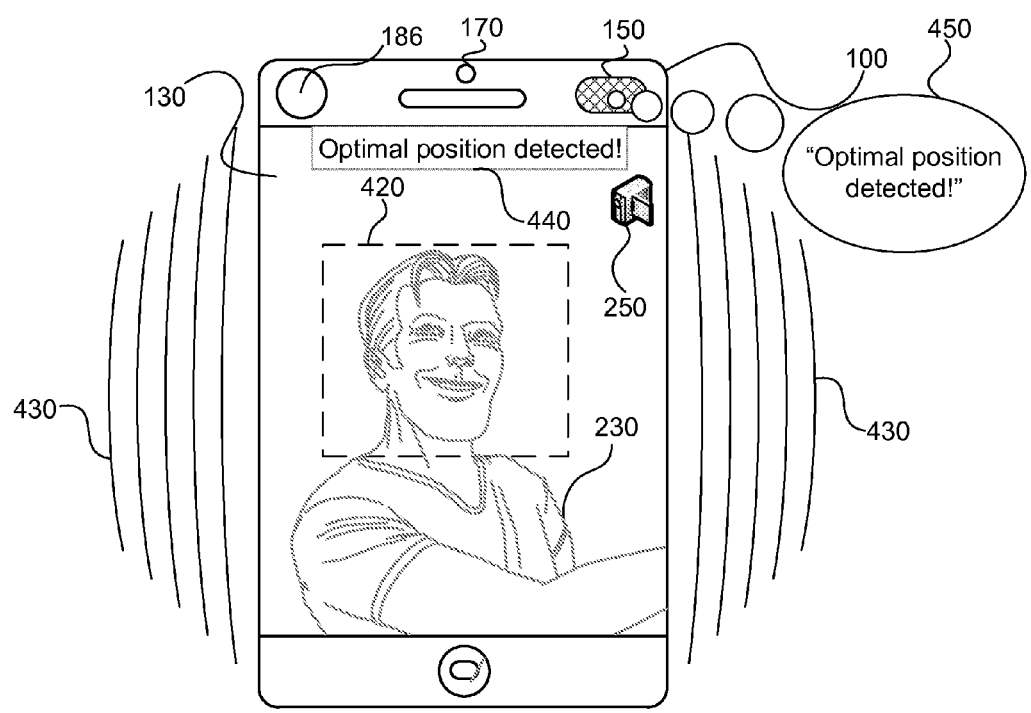
FIG. 6 illustrates instructing a user, using vibration based haptic feedback, to an optimal position for capturing an image with a communication device, according to some embodiments.

FIG. 6 illustrates instructing a user, using vibration based haptic feedback 430, to an optimal position for capturing an image with a communication device 100, according to some embodiments. As described above, vibration based haptic feedback 430 is one of many types of haptic feedback that may be provided on the communication device 100. The vibration based haptic feedback 430 may be enabled upon the light measurement module 192 (FIG. 1) determining that the ambient light present in the environment exceeds the threshold amount of light. In some embodiments, the vibration based haptic feedback 430 may already be enabled or an intensity of the feedback may be changed based upon the determination by the light measurement module 192 (FIG. 1).

As shown in FIG. 6A, the content 230 (preview of camera image) shown on the display 130 is washed out and difficult to view. For a "selfie" image, the vibration based haptic feedback 430 may be provided to assist the user to position themselves in a position within the image frame, prior to capturing the image. The optimal location within the image frame may be predefined or may be based on other objects detected within the image frame. For example, the optimal position within the image frame could simply be the center of the image frame, or could be on a side of the image frame that does not obstruct other scenery within the image frame, e.g. trees. Prior to capturing and storing the image, the image capture module 194 (FIG. 1) may analyze current image frames from camera 186. If the image capture module 194 (FIG. 1) detects a face within the image frame, the communication device 100 may provide vibration based haptic feedback 430 to instruct the user to move themselves to the optimal position within the image frame. The vibration based haptic feedback 430 may be provided by using vibration motor 180 (FIG. 1), to notify the user of such. Additionally, the optimal position within the image frame may be outlined by an outline box 420 displayed within the user interface of the display 130.

For example, if the user points the communication device 100 towards themself to attempt capturing a "selfie" image using the front facing camera 186 and the user is determined (by image capture module 194 (FIG. 1)) to be too far to the left within the image frame, the right side of the communication device 100 may vibrate. Similarly, if the user is determined to be too far to the right within the image, the left side of the communication device 100 may vibrate. In other embodiments, this may be accomplished using multiple actuators mounted along the display of the communication device 100. In another example, if the user is determined to be blocking a group of trees on the right side within the image frame, the left side of the communication device 100 may vibrate, as an instruction for the user to move to the left.

It can be appreciated that other types of haptic feedback apart from vibration based haptic feedback may be used to instruct the user to position themself within the optimal position. For example, electrostatic based haptic feedback and/or thermal based haptic feedback may be used. Once the user has moved to the optimal position within the image frame, e.g. within the outline box 420, the communication device 100 may provide further haptic feedback. For example, once the user has moved to the optimal position within the image frame, the communication device 100 may provide vibration based haptic feedback 430 to indicate to the user that an optimal image may now be captured.

The user may then proceed using the communication device 100 to capture the "selfie" image. Since the user may not be able to clearly view the display 130, due to the high amount of ambient light, the user may move their finger randomly around the display 130 in an attempt to press a shutter button 250 within the user interface to capture the image. The communication device 100 may provide haptic feedback indicating that the user has correctly pressed the shutter button 250. For example, once the user moves his/her finger over the shutter button 250 within the user interface of display 130, the communication device 100 may provide vibration based haptic feedback 430 to indicate to the user that he/she has correctly captured an image by pressing the shutter button 250. In some embodiments, where more than one button 421 exists, the communication device 100 may provide a different type or duration of haptic feedback per each button interaction. For example, if two buttons are presented to the user representing a shutter button 250 and, e.g. a flash enable button (not shown) selection, the communication device 100 may provide three rapid instances of vibration based haptic feedback 430 for the shutter button 250 selection and two rapid instances of vibration based haptic feedback 430 for the flash enable button selection. Alternatively, the communication device 100 may provide high duration vibration based haptic feedback 430 for the shutter button 250 selection and low duration vibration based haptic feedback 430 for the flash enable button selection. In another example, the communication device 100 may provide electrostatic based haptic feedback to allow the user to feel the shutter button 250 prior to pressing it.

In some embodiments, the image capture module 194 (FIG. 1) may automatically capture and store an image upon detecting that the user has moved the communication device 100 to an optimal distance from him/her. There may be a delay, e.g. 2 seconds, between detecting the frame and capturing the image. The communication device 100 may provide vibration based haptic feedback 430 once the image has been captured. By automatically capturing the image, the communication device 100 provides assistance to the user in capturing images while in bright environments where the content 230 on the display 130 may be difficult to view.

In some embodiments, the communication device 100 may provide audio feedback 450 concurrently with the vibration based haptic feedback 430. For example, the communication device 100 may play an audio phrase, via speaker 150, reciting "Optimal position detected!" concurrently with the vibration based haptic feedback 430. In some embodiments, the communication device 100 may provide text feedback 440 concurrently with the vibration based haptic feedback 430. For example, the communication device 100 may display within the user interface of the display 130, "Optimal position detected!" The text feedback 440 may be displayed at the highest brightness setting. In some embodiments, more than one type of haptic feedback may be provided concurrently by the communication device 100. For example, the vibration based haptic feedback 430 may be provided concurrently with electrostatic based haptic feedback and/or thermal based haptic feedback.

Once the light measurement module 192 (FIG. 1) determines that the ambient light sensor 170 has obtained an ambient light measurement that is below the predefined threshold amount of light, the haptic feedback may be disabled or changed by haptic feedback module 196 (FIG. 1).

Figure 7A:
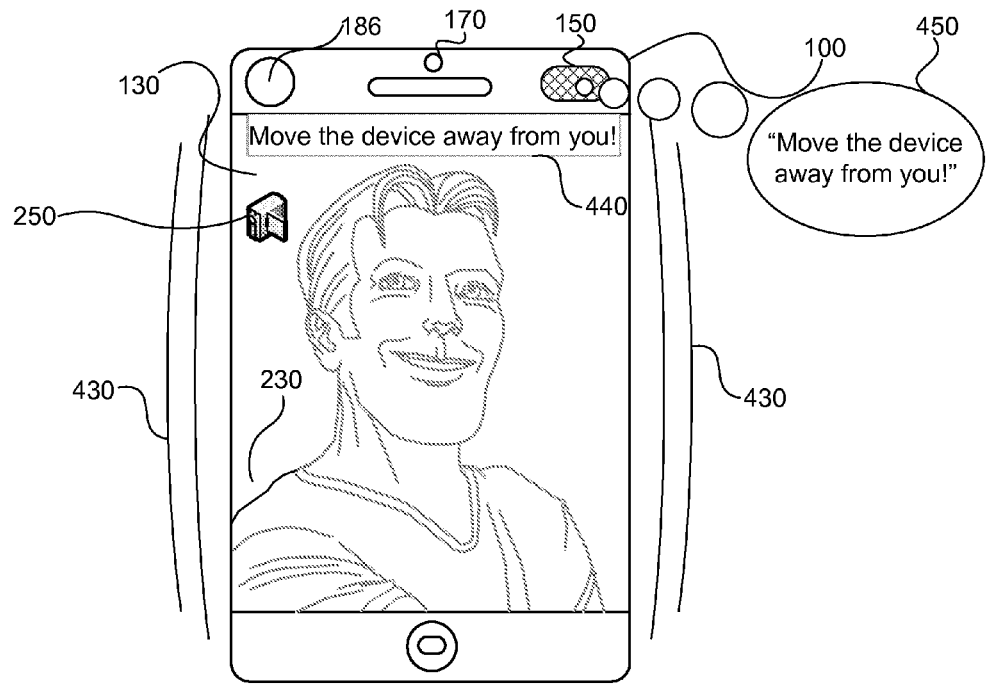
FIG. 7A illustrates instructing a user, using vibration based haptic feedback 430, to move a communication device 100 further away from the user for capturing an image, according to some embodiments.

FIG. 7A illustrates instructing a user, using vibration based haptic feedback 430, to move a communication device 100 further away from the user for capturing an image, according to some embodiments. As described above, vibration based haptic feedback 430 is one of many types of haptic feedback that may be provided on the communication device 100. The vibration based haptic feedback 430 may be enabled upon the light measurement module 192 (FIG. 1) determining that the ambient light present in the environment exceeds the threshold amount of light. In some embodiments, the vibration based haptic feedback 430 may already be enabled or an intensity of the feedback may be changed based upon the determination by the light measurement module 192 (FIG. 1).

As shown in FIG. 7A, the content 230 (preview of camera image) shown on the display 130 is washed out and difficult to view. The vibration based haptic feedback 430 may be provided to assist the user in capturing a "selfie" image. More specifically, the vibration based haptic feedback 430 may provide instructions to the user to adjust a distance between the communication device 100 and him/her. Prior to capturing and storing the image, the image capture module 194 (FIG. 1) may analyze current image frames from camera 186. If the image capture module 194 (FIG. 1) determines that the user is too close to the image frame and that the user's entire body may not be captured, the communication device 100 may provide vibration based haptic feedback 430 to notify the user that he/she needs to move the communication device 100 further away. The vibration based haptic feedback 430 may be provided by using vibration motor 180 (FIG. 1), to notify the user of such. In some embodiments, the vibration based haptic feedback 430 may be low intensity, indicating that the user is too close to the communication device 100. In some embodiments, the communication device 100 may provide a predefined number of instances of vibration based haptic feedback 430 to indicate that the user is too close to the communication device 100. For example, the communication device 100 may vibrate three times if the user is too close to the communication device 100. In some embodiments, the communication device 100 may provide a certain type of haptic feedback if the user is too close to the communication device 100. For example, the communication device 100 may provide thermal or electrostatic based haptic feedback if the user is too close the communication device 100. Once the user has moved the communication device 100 to a proper distance, the communication device 100 may provide further vibration based haptic feedback 430 to indicate to the user that he/she may continue to capture the image since he/she is at the proper distance to capture the image. In another example, the communication device 100 may provide electrostatic based haptic feedback to convey that the communication device 100 is too close or too far from the user. A zoom slider presented on the display of the communication device 100 may become rough as the user's face goes out of view and may become smooth as the user's face is within view of the camera of the communication device 100.

Since the user may not be able to clearly view the display 130, due to the high amount of ambient light, the user may move their finger randomly around the display 130 in an attempt to press a shutter button 250 within the user interface to capture the image. The communication device 100 may provide haptic feedback indicating that the user has correctly pressed the shutter button 250. For example, once the user moves his/her finger over the shutter button 250 within the user interface of display 130, the communication device 100 may provide vibration based haptic feedback 430 to indicate to the user that he/she has correctly captured an image by pressing the shutter button 250. In some embodiments, where more than one button 421 exists, the communication device 100 may provide a different type or duration of haptic feedback per each button interaction. For example, if two buttons are presented to the user representing a shutter button 250 and, e.g. a flash enable button (not shown) selection, the communication device 100 may provide three rapid instances of vibration based haptic feedback 430 for the shutter button 250 selection and two rapid instances of vibration based haptic feedback 430 for the flash enable button selection. Alternatively, the communication device 100 may provide high duration vibration based haptic feedback 430 for the shutter button 250 selection and low duration vibration based haptic feedback 430 for the flash enable button selection.

In some embodiments, the image capture module 194 (FIG. 1) may automatically capture and store an image upon detecting the face 410 within the image frame of the camera 186. There may be a delay, e.g. 2 seconds, between detecting the frame and capturing the image. The communication device 100 may provide vibration based haptic feedback 430 once the image has been captured. By automatically capturing the image, the communication device 100 provides assistance to the user in capturing images while in bright environments where the content 230 on the display 130 may be difficult to view.

In some embodiments, the communication device 100 may provide audio feedback 450 concurrently with the vibration based haptic feedback 430. For example, the communication device 100 may play an audio phrase, via speaker 150, reciting "Move the device away from you!" concurrently with the vibration based haptic feedback 430. In some embodiments, the communication device 100 may provide text feedback 440 concurrently with the vibration based haptic feedback 430. For example, the communication device 100 may display within the user interface of the display 130, "Move the device away from you!!" The text feedback 440 may be displayed at the highest brightness setting. In some embodiments, more than one type of haptic feedback may be provided concurrently by the communication device 100. For example, the vibration based haptic feedback 430 may be provided concurrently with electrostatic based haptic feedback and/or thermal based haptic feedback.

Once the light measurement module 192 (FIG. 1) determines that the ambient light sensor 170 has obtained an ambient light measurement that is below the predefined threshold amount of light, the haptic feedback may be disabled or changed by haptic feedback module 196 (FIG. 1).

Figure 7B:
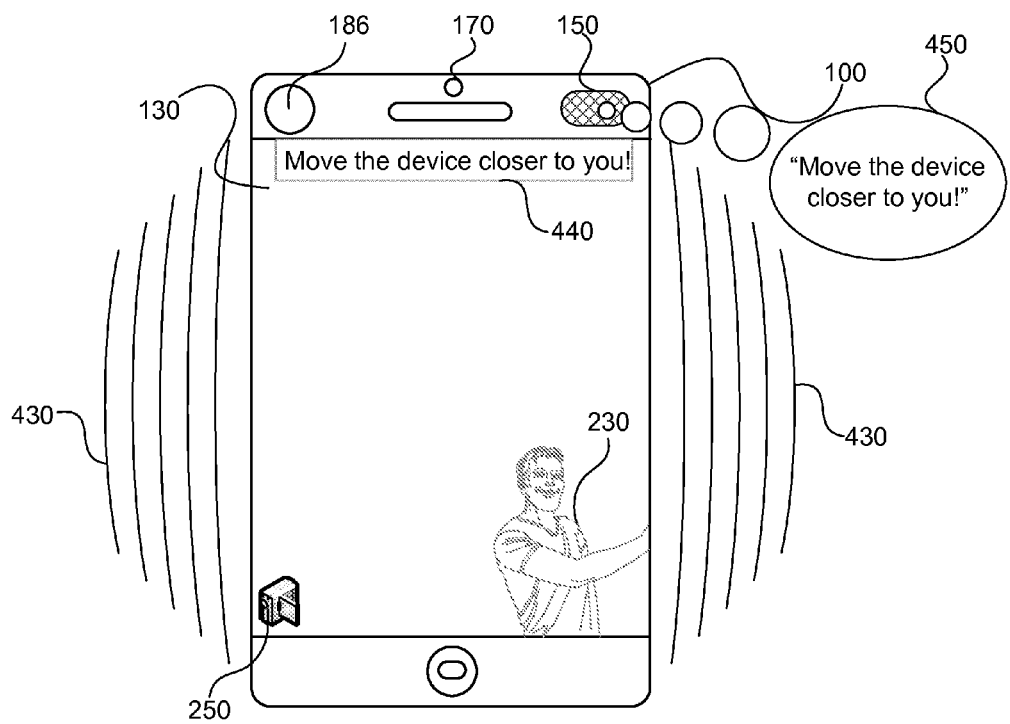
FIG. 7B illustrates instructing a user, using vibration based haptic feedback 430, to move a communication device 100 closer to the user for capturing an image, according to some embodiments.

FIG. 7B illustrates instructing a user, using vibration based haptic feedback 430, to move a communication device 100 further away from the user for capturing an image, according to some embodiments. FIG. 7B is similar to FIG. 7A except that it depicts the user being too far away from the communication device 100 to capture an optimal image. If the image capture module 194 (FIG. 1) determines that the user is too far from the image frame and that the details of the user may not be captured, the communication device 100 may provide vibration based haptic feedback 430 to notify the user that he/she needs to move the communication device 100 closer. In some embodiments, the vibration based haptic feedback 430 may be high intensity, indicating that the user is too far from the communication device 100. In some embodiments, the communication device 100 may provide a predefined number of instances of vibration based haptic feedback 430 to indicate that the user is too far from the communication device 100. For example, the communication device 100 may vibrate five times if the user is too far from the communication device 100. In some embodiments, the communication device 100 may provide a certain type of haptic feedback if the user is too far from the communication device 100. For example, the communication device 100 may provide thermal or electrostatic based haptic feedback if the user is too far from the communication device 100. Once the user has moved the communication device 100 to a proper distance, the communication device 100 may provide further vibration based haptic feedback 430 to indicate to the user that he/she may continue to capture the image since he/she is at the proper distance to capture the image, or may automatically capture the image as described above.

Similar to what is described in FIG. 7A, the communication device 100 may also provide audio feedback 450 or text feedback 440 concurrently with the haptic feedback to instruct the user to move the device closer to him/her.

Figure 8:
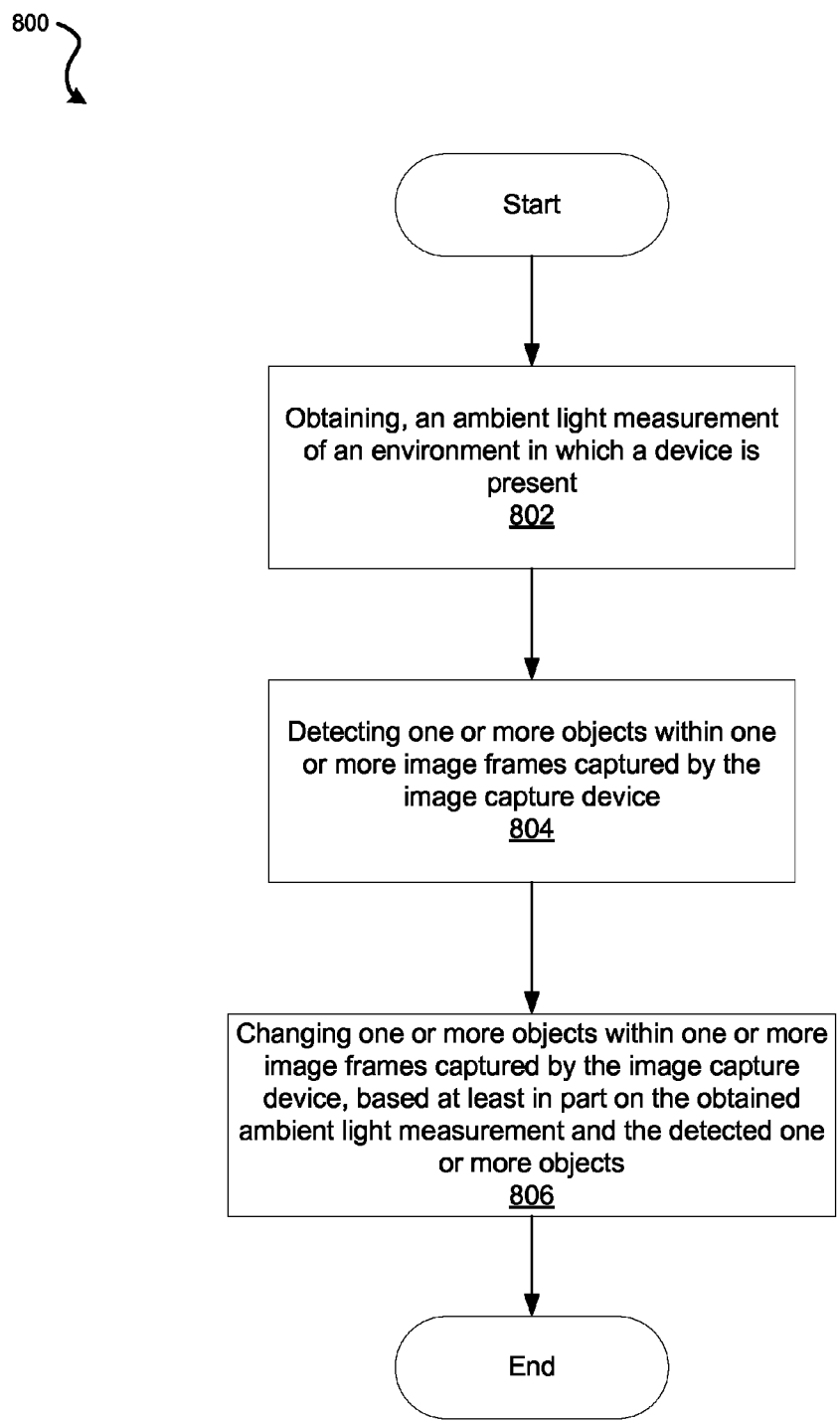
FIG. 8 is an illustrative flow chart depicting an exemplary operation for providing haptic feedback to assist in capturing images with a communication device.

FIG. 8 is an illustrative flow chart 800 depicting an exemplary operation for providing haptic feedback to assist in capturing images with a communication device. In block 802, an ambient light measurement is obtained, via the device, of an environment in which the device is present. The ambient light measurement may be obtained using one or more ambient light sensors within the device. For example, in FIG. 2, the ambient light sensor obtains an ambient light measurement of the environment that the communication device is currently in. The light measurement module may then analyze the obtained ambient light measurement to determine whether a manner in which haptic feedback is provided to a user of the communication device is changed.

In block 804, one or more objects within one or more image frames captured by the image capture device are detected. The detecting of the objects may be performed by an image capture module. For example, in FIG. 4A, the user's face within the image frame is detected by the image capture module. The image capture module may determine whether the object is within an optimal location and/or an optimal distance within the image frame.

In block 806, a manner in which haptic feedback is provided to a user of the device is changed, based at least in part on the obtained ambient light measurement and the detected one or more objects. In some embodiments, changing the manner in which the haptic feedback is provided includes enabling the haptic feedback on the device. In some embodiments, changing the manner in which the haptic feedback is provided includes disabling the haptic feedback on the device. In some embodiments, changing the manner in which the haptic feedback is provided includes changing an intensity of the haptic feedback on the device. In some embodiments, changing the manner in which the haptic feedback is provided includes changing a frequency of the haptic feedback on the device. In some embodiments, changing the manner in which the haptic feedback is provided includes changing a type or duration of the haptic feedback on the device. In some embodiments, the haptic feedback comprises at least one of tactile feedback, vibration feedback, electrostatic feedback, or thermal feedback.

For example, in FIG. 2, the haptic feedback module may change a manner in which haptic feedback is provided to the communication device based on a determination made by the light measurement module. If the light measurement module has determined a high amount of ambient light within the environment, the haptic feedback module may enable or change a type of haptic feedback provided on the device. Conversely, if the light measurement module has determined a low amount of ambient light within the environment, the haptic feedback module may disable or change a type of haptic feedback provided on the device. The haptic feedback may be used to assist the user in capturing an image with the device.

Figure 9:
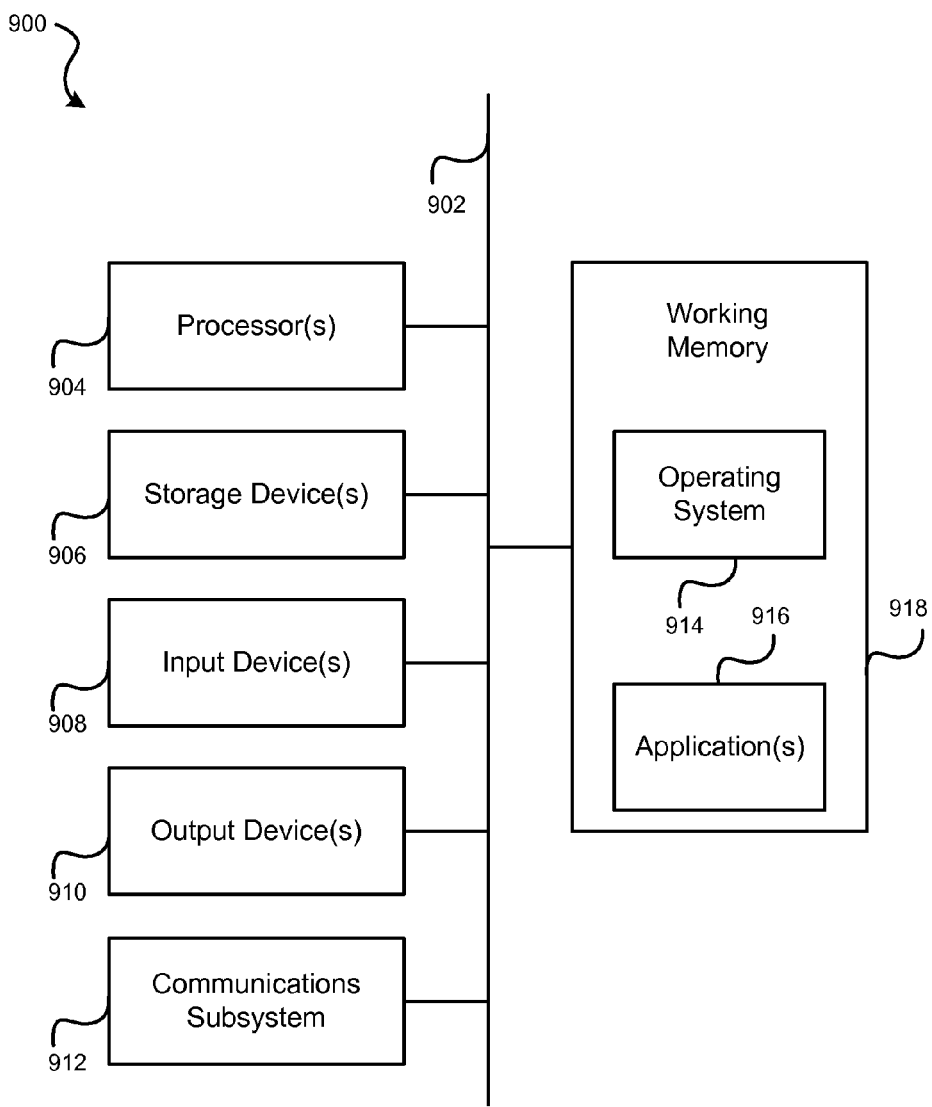
FIG. 9 illustrates an example of a computing system in which one or more embodiments may be implemented.

FIG. 9 illustrates an example of a computing system in which one or more embodiments may be implemented. A computer system as illustrated in FIG. 9 may be incorporated as part of the above described computerized device. For example, computer system 900 can represent some of the components of a television, a computing device, a server, a desktop, a workstation, a control or interaction system in an automobile, a tablet, a netbook or any other suitable computing system. A computing device may be any computing device with an image capture device or input sensory unit and a user output device. An image capture device or input sensory unit may be a camera device. A user output device may be a display unit. Examples of a computing device include but are not limited to video game consoles, tablets, smart phones and any other hand-held devices. FIG. 9 provides a schematic illustration of one embodiment of a computer system 900 that can perform the methods provided by various other embodiments, as described herein, and/or can function as the host computer system, a remote kiosk/terminal, a point-of-sale device, a telephonic or navigation or multimedia interface in an automobile, a computing device, a set-top box, a table computer and/or a computer system. FIG. 9 is meant only to provide a generalized illustration of various components, any or all of which may be utilized as appropriate. FIG. 9, therefore, broadly illustrates how individual system elements may be implemented in a relatively separated or relatively more integrated manner. In some embodiments, elements computer system 900 may be used to implement functionality of device 100 in FIG. 1.

The computer system 900 is shown comprising hardware elements that can be electrically coupled via a bus 902 (or may otherwise be in communication, as appropriate). The hardware elements may include one or more processors 904, including without limitation one or more general-purpose processors and/or one or more special-purpose processors (such as digital signal processing chips, graphics acceleration processors, and/or the like); one or more input devices 908, which can include without limitation one or more cameras, sensors, a mouse, a keyboard, a microphone configured to detect ultrasound or other sounds, and/or the like; and one or more output devices 910, which can include without limitation a display unit such as the device used in embodiments of the invention, a printer and/or the like.

In some implementations of the embodiments of the invention, various input devices 908 and output devices 910 may be embedded into interfaces such as display devices, tables, floors, walls, and window screens. Furthermore, input devices 908 and output devices 910 coupled to the processors may form multi-dimensional tracking systems.

The computer system 900 may further include (and/or be in communication with) one or more non-transitory storage devices 906, which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data storage, including without limitation, various file systems, database structures, and/or the like.

The computer system 900 might also include a communications subsystem 912, which can include without limitation a modem, a network card (wireless or wired), an infrared communication device, a wireless communication device and/or chipset (such as a Bluetooth™ device, an 802.11 device, a Wi-Fi device, a WiMax device, cellular communication facilities, etc.), and/or the like. The communications subsystem 912 may permit data to be exchanged with a network, other computer systems, and/or any other devices described herein. In many embodiments, the computer system 900 will further comprise a non-transitory working memory 918, which can include a RAM or ROM device, as described above.

The computer system 900 also can comprise software elements, shown as being currently located within the working memory 918, including an operating system 914, device drivers, executable libraries, and/or other code, such as one or more application programs 916, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a computer-readable storage medium, such as the storage device(s) 906 described above. In some cases, the storage medium might be incorporated within a computer system, such as computer system 900. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions might take the form of executable code, which is executable by the computer system 900 and/or might take the form of source and/or installable code, which, upon compilation and/or installation on the computer system 900 (e.g., using any of a variety of generally available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed. In some embodiments, one or more elements of the computer system 900 may be omitted or may be implemented separate from the illustrated system.

For example, the processor 904 and/or other elements may be implemented separate from the input device 908. In one embodiment, the processor is configured to receive images from one or more cameras that are separately implemented. In some embodiments, elements in addition to those illustrated in FIG. 9 may be included in the computer system 900.

Some embodiments may employ a computer system (such as the computer system 900) to perform methods in accordance with the disclosure. For example, some or all of the procedures of the described methods may be performed by the computer system 900 in response to processor 904 executing one or more sequences of one or more instructions (which might be incorporated into the operating system 914 and/or other code, such as an application program 916) contained in the working memory 918. Such instructions may be read into the working memory 918 from another computer-readable medium, such as one or more of the storage device(s) 906. Merely by way of example, execution of the sequences of instructions contained in the working memory 918 might cause the processor(s) 904 to perform one or more procedures of the methods described herein.

The terms "machine-readable medium" and "computer-readable medium," as used herein, refer to any medium that participates in providing data that causes a machine to operate in a specific fashion. In some embodiments implemented using the computer system 900, various computer-readable media might be involved in providing instructions/code to processor(s) 904 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media include, for example, optical and/or magnetic disks, such as the storage device(s) 906. Volatile media include, without limitation, dynamic memory, such as the working memory 918. Transmission media include, without limitation, coaxial cables, copper wire and fiber optics, including the wires that comprise the bus 902, as well as the various components of the communications subsystem 912 (and/or the media by which the communications subsystem 912 provides communication with other devices). Hence, transmission media can also take the form of waves (including without limitation radio, acoustic and/or light waves, such as those generated during radio-wave and infrared data communications).

Common forms of physical and/or tangible computer-readable media include, for example, a floppy disk, a flexible disk, hard disk, magnetic tape, or any other magnetic medium, a CD-ROM, any other optical medium, punch-cards, papertape, any other physical medium with patterns of holes, a RAM, a PROM, EPROM, a FLASH-EPROM, any other memory chip or cartridge, a carrier wave as described hereinafter, or any other medium from which a computer can read instructions and/or code.

Various forms of computer-readable media may be involved in carrying one or more sequences of one or more instructions to the processor(s) 904 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 900. These signals, which might be in the form of electromagnetic signals, acoustic signals, optical signals and/or the like, are all examples of carrier waves on which instructions can be encoded, in accordance with various embodiments of the invention.

The communications subsystem 912 (and/or components thereof) generally will receive the signals, and the bus 902 then might carry the signals (and/or the data, instructions, etc. carried by the signals) to the working memory 918, from which the processor(s) 904 retrieves and executes the instructions. The instructions received by the working memory 918 may optionally be stored on a non-transitory storage device 906 either before or after execution by the processor(s) 904.

The methods, systems, and devices discussed above are examples. Various embodiments may omit, substitute, or add various procedures or components as appropriate. For instance, in alternative configurations, the methods described may be performed in an order different from that described, and/or various stages may be added, omitted, and/or combined. Also, features described with respect to certain embodiments may be combined in various other embodiments. Different aspects and elements of the embodiments may be combined in a similar manner. Also, technology evolves and, thus, many of the elements are examples that do not limit the scope of the disclosure to those specific examples.

Specific details are given in the description to provide a thorough understanding of the embodiments. However, embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

Also, some embodiments are described as processes depicted as flow diagrams or block diagrams. Although each may describe the operations as a sequential process, many of the operations can be performed in parallel or concurrently. In addition, the order of the operations may be rearranged. A process may have additional steps not included in the figures. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. Processors may perform the associated tasks. Thus, in the description above, functions or methods that are described as being performed by the computer system may be performed by a processor—for example, the processor 904—configured to perform the functions or methods. Further, such functions or methods may be performed by a processor executing instructions stored on one or more computer readable media.

Having described several embodiments, various modifications, alternative constructions, and equivalents may be used without departing from the spirit of the disclosure. For example, the above elements may merely be a component of a larger system, wherein other rules may take precedence over or otherwise modify the application of the invention. Also, a number of steps may be undertaken before, during, or after the above elements are considered. Accordingly, the above description does not limit the scope of the disclosure.

Various examples have been described. These and other examples are within the scope of the following claims.

What is claimed is:

1. A method for providing a haptic feedback to assist in capturing images, comprising:
   obtaining, via an image capture device, an ambient light measurement of an environment in which the image capture device is present;
   detecting, via the image capture device, one or more objects within one or more image frames captured by the image capture device; and
   changing, via the image capture device, a manner in which the haptic feedback is provided to a user of the image capture device, based at least in part on the obtained ambient light measurement and the detected one or more objects,
   wherein the haptic feedback is either enabled or disabled, depending on the ambient light measurement,
   wherein if the haptic feedback is enabled, the image capture device conveys at least one item of information to assist the user in recording an image by using the haptic feedback, and
   wherein if the haptic feedback is disabled, the image capture device conveys the at least one item of information to assist the user in recording an image without using the haptic feedback.

2. The method of claim 1 wherein the step of detecting one or more objects comprises detecting a face within the one or more image frames captured by the image capture device.

3. The method of claim 1 wherein the step of changing the manner in which the haptic feedback is provided comprises increasing an intensity of the haptic feedback provided.

4. The method of claim 1 wherein the step of changing the manner in which the haptic feedback is provided comprises changing a type of the haptic feedback provided.

5. The method of claim 1 wherein the step of changing the manner in which the haptic feedback is provided comprises at least one of changing a frequency with which the haptic feedback is provided or changing a duration with which the haptic feedback is provided.

6. The method of claim 1 wherein the manner in which the haptic feedback is provided is changed based at least in part on a location, within the one or more image frames, of the detected objects relative to an optimal location within the one or more image frames.

7. The method of claim 1 wherein the manner in which the haptic feedback is provided is changed based at least in part on a size, within the one or more image frames, of the detected objects relative to a size of the one or more image frames.

8. The method of claim 1 wherein the haptic feedback comprises at least one of tactile feedback, vibration feedback, electrostatic feedback, or thermal feedback.

9. The method of claim 1 wherein a type of the haptic feedback is based at least in part on a quantity of the one or more detected objects.

10. The method of claim 1 wherein the obtaining step is performed using one or more ambient light sensors within the image capture device.

11. An apparatus for providing a haptic feedback to assist in capturing images, comprising:
    an image capture device configured to capture one or more image frames;
    an ambient light sensor configured to obtain an ambient light measurement of an environment in which the apparatus is present; and
    a processor coupled to the ambient light sensor and the image capture device, wherein the processor is configured to detect one or more objects within the one or more image frames; and change a manner in which the haptic feedback is provided to a user of the apparatus, based at least in part on the obtained ambient light measurement and the detected one or more objects,
    wherein the processor is configured to either enable or disable the haptic feedback, depending on the ambient light measurement,
    wherein if the haptic feedback is enabled, the image capture device is configured to convey at least one item of information to assist the user in recording an image by using the haptic feedback, and
    wherein if the haptic feedback is disabled, the image capture device is configured to convey the at least one item of information to assist the user in recording an image without using the haptic feedback.

12. The apparatus of claim 11 wherein the detecting one or more objects comprises detecting a face within the one or more image frames captured by the image capture device.

13. The apparatus of claim 11 wherein the changing the manner in which the haptic feedback is provided comprises increasing an intensity of the haptic feedback provided.

14. The apparatus of claim 11 wherein the changing the manner in which the haptic feedback is provided comprises changing a type of the haptic feedback provided.

15. The apparatus of claim 11 wherein the changing the manner in which the haptic feedback is provided comprises at least one of changing a frequency with which the haptic feedback is provided or changing a duration with which the haptic feedback is provided.

16. The apparatus of claim 11 wherein the manner in which the haptic feedback is provided is changed based at least in part on a location, within the one or more image frames, of the detected objects relative to an optimal location within the one or more image frames.

17. The apparatus of claim 11 wherein the manner in which the haptic feedback is provided is changed based at least in part on a size, within the one or more image frames, of the detected objects relative to a size of the one or more image frames.

18. The apparatus of claim 11 wherein the haptic feedback comprises at least one of tactile feedback, vibration feedback, electrostatic feedback, or thermal feedback.

19. The apparatus of claim 11 wherein a type of the haptic feedback is based at least in part on a quantity of the one or more detected objects.

20. The apparatus of claim 11 further comprising a speaker configured to provide audio feedback, concurrently with the haptic feedback, to the user of the apparatus.

21. An apparatus for providing a haptic feedback to assist in capturing images, comprising:
    means for obtaining, via an image capture device, an ambient light measurement of an environment in which the image capture device is present;
    means for detecting, via the image capture device, one or more objects within one or more image frames captured by the image capture device; and
    means for changing, via the image capture device, a manner in which the haptic feedback is provided to a user of the image capture device, based at least in part on the obtained ambient light measurement and the detected one or more objects, wherein the haptic feedback is either enabled or disabled, depending on the ambient light measurement, wherein if the haptic feedback is enabled, the image capture device conveys at least one item of information to assist the user in recording an image by using the haptic feedback, and wherein if the haptic feedback is disabled, the image capture device conveys the at least one item of information to assist the user in recording an image without using the haptic feedback.

22. The apparatus of claim 21 wherein the means for detecting one or more objects comprises means for detecting a face within the one or more image frames captured by the image capture device.

23. The apparatus of claim 21 wherein the means for changing the manner in which the haptic feedback is provided comprises at least one of means for increasing an intensity of the haptic feedback provided, means for changing a type of the haptic feedback provided, means for changing a duration of the haptic feedback provided, or means for changing a frequency with which the haptic feedback is provided.

24. The apparatus of claim 21 wherein the manner in which the haptic feedback is provided is changed based at least in part on a location, within the one or more image frames, of the detected objects relative to an optimal location within the one or more image frames.

25. The apparatus of claim 21 wherein the manner in which the haptic feedback is provided is changed based at least in part on a size, within the one or more image frames, of the detected objects relative to a size of the one or more image frames.

26. The apparatus of claim 21 wherein a type of the haptic feedback is based at least in part on a quantity of the one or more detected objects.

27. A processor-readable non-transitory medium comprising processor readable instructions configured to cause a processor to:

obtain, via an image capture device, an ambient light measurement of an environment in which the image capture device is present;

detect, via the image capture device, one or more objects within one or more image frames captured by the image capture device; and change, via the image capture device, a manner in which the haptic feedback is provided to a user of the image capture device, based at least in part on the obtained ambient light measurement and the detected one or more objects, wherein the haptic feedback is either enabled or disabled, depending on the ambient light measurement, wherein if the haptic feedback is enabled, the image capture device conveys at least one item of information to assist the user in recording an image by using the haptic feedback, and wherein if the haptic feedback is disabled, the image capture device conveys the at least one item of information to assist the user in recording an image without using the haptic feedback.

28. The processor-readable non-transitory medium of claim 27 wherein the detecting one or more objects comprises detecting a face within the one or more image frames captured by the image capture device.

29. The processor-readable non-transitory medium of claim 27 wherein the changing the manner in which the haptic feedback is provided comprises at least one of increasing an intensity of the haptic feedback provided, changing a type of the haptic feedback provided, changing a duration of the haptic feedback provided, or changing a frequency with which the haptic feedback is provided.

30. The processor-readable non-transitory medium of claim 27 wherein the manner in which the haptic feedback is provided is changed based at least in part on a location, within the one or more image frames, of the detected objects relative to an optimal location within the one or more image frames.

31. The processor-readable non-transitory medium of claim 27 wherein the manner in which the haptic feedback is provided is changed based at least in part on a size, within the one or more image frames, of the detected objects relative to a size of the one or more image frames.

32. The processor-readable non-transitory medium of claim 27 wherein a type of the haptic feedback is based at least in part on a quantity of the one or more detected objects.

* * * * *